(12) United States Patent
Todd

(10) Patent No.: US 10,338,975 B2
(45) Date of Patent: Jul. 2, 2019

(54) CONTENTION MANAGEMENT IN A DISTRIBUTED INDEX AND QUERY SYSTEM

(71) Applicant: VMware, Inc., Palo Alto, CA (US)

(72) Inventor: Christopher Todd, Fircrest, WA (US)

(73) Assignee: VMware, Inc., Palo Alto, CA (US)

( * ) Notice: Subject to any disclaimer, the term of this patent is extended or adjusted under 35 U.S.C. 154(b) by 163 days.

(21) Appl. No.: 15/646,382

(22) Filed: Jul. 11, 2017

(65) Prior Publication Data

US 2019/0018714 A1 Jan. 17, 2019

(51) Int. Cl.
| | |
|---|---|
| *G06F 9/46* | (2006.01) |
| *G06F 9/52* | (2006.01) |
| *G06F 9/50* | (2006.01) |
| *G06F 11/14* | (2006.01) |
| *G06F 16/27* | (2019.01) |
| *G06F 16/22* | (2019.01) |
| *G06F 16/2455* | (2019.01) |

(52) U.S. Cl.
CPC .............. *G06F 9/52* (2013.01); *G06F 9/5016* (2013.01); *G06F 11/1464* (2013.01); *G06F 16/2228* (2019.01); *G06F 16/2455* (2019.01); *G06F 16/27* (2019.01)

(58) Field of Classification Search
CPC ........... G06F 16/2264; G06F 16/24532; G06F 16/2455; G06F 16/90339; G06F 16/951
See application file for complete search history.

(56) References Cited

U.S. PATENT DOCUMENTS

| | | | |
|---|---|---|---|
| 2009/0172674 A1* | 7/2009 | Bobak ................ | G06F 11/1482 718/101 |
| 2011/0252018 A1* | 10/2011 | Bhose ................. | G06F 16/951 707/711 |
| 2015/0081719 A1* | 3/2015 | Ray ..................... | G06F 16/29 707/743 |
| 2015/0234884 A1* | 8/2015 | Henriksen ........... | G06F 16/21 707/623 |
| 2016/0036903 A1* | 2/2016 | Pal ...................... | G06F 16/951 709/213 |
| 2017/0046382 A1* | 2/2017 | Li ....................... | G06F 16/90339 |

\* cited by examiner

*Primary Examiner* — Dong U Kim

(57) ABSTRACT

In a method of contention management in the distributed index and query system, one or more index processing threads of an index thread pool in a distributed computing environment is used to index documents buffered into a work queue buffer after being received via a network connection. Simultaneous to the indexing, one or more query processing threads of a query thread pool to is utilized to process received queries of indexed documents. A sum of the index processing threads and the query processing threads is a plurality of processing threads. Responsive to the work queue buffer reaching a predefined fullness, the work queue buffer is emptied into an allotted storage space in a data storage device. The number of index processing threads is set in a linear relationship to a ratio of a utilized amount of the allotted storage space to a total amount of the allotted storage space.

19 Claims, 11 Drawing Sheets

300

UTILIZING ONE OR MORE INDEX PROCESSING THREADS OF AN INDEX THREAD POOL IN A DISTRIBUTED COMPUTING ENVIRONMENT TO INDEX DOCUMENTS BUFFERED INTO A WORK QUEUE BUFFER IN A MEMORY OF THE DISTRIBUTED INDEX AND QUERY SYSTEM AFTER BEING RECEIVED VIA A NETWORK CONNECTION
310

SIMULTANEOUS TO THE INDEXING, UTILIZING ONE OR MORE QUERY PROCESSING THREADS OF A QUERY THREAD POOL TO PROCESS QUERIES, RECEIVED VIA THE NETWORK CONNECTION, OF INDEXED DOCUMENTS, WHEREIN A SUM OF THE INDEX THREAD POOL AND THE QUERY THREAD POOL IS A PLURALITY OF PROCESSING THREADS
320

RESPONSIVE TO THE WORK QUEUE BUFFER REACHING A PREDEFINED FULLNESS, EMPTYING THE WORK QUEUE BUFFER BY BACKING UP THE WORK QUEUE BUFFER INTO AN ALLOTTED STORAGE SPACE IN A DATA STORAGE DEVICE OF THE DISTRIBUTED COMPUTING SYSTEM
330

SETTING A NUMBER OF INDEX PROCESSING THREADS, OF THE PLURALITY OF PROCESSING THREADS ALLOCATED TO THE INDEX THREAD POOL, IN A LINEAR RELATIONSHIP TO A RATIO OF A UTILIZED AMOUNT OF THE ALLOTTED STORAGE SPACE TO A TOTAL AMOUNT OF THE ALLOTTED STORAGE SPACE
340

FIG. 3A

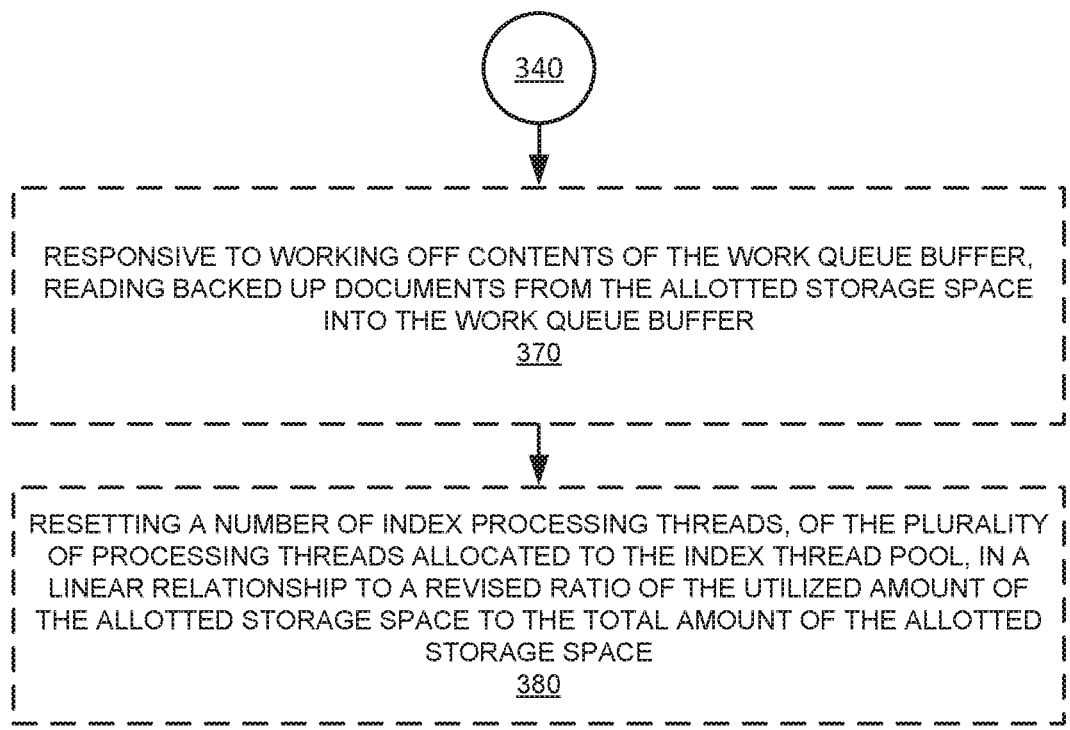

400

```
┌─────────────────────────────────────────────────────────────┐
│ UTILIZING ONE OR MORE INDEX PROCESSING THREADS OF AN INDEX  │
│ THREAD POOL IN A DISTRIBUTED COMPUTING ENVIRONMENT TO INDEX │
│ DOCUMENTS BUFFERED INTO A WORK QUEUE BUFFER IN A MEMORY OF  │
│ THE DISTRIBUTED INDEX AND QUERY SYSTEM AFTER BEING RECEIVED │
│ VIA A NETWORK CONNECTION                                    │
│ 410                                                         │
└─────────────────────────────────────────────────────────────┘
                              │
                              ▼
┌─────────────────────────────────────────────────────────────┐
│ SIMULTANEOUS TO THE INDEXING, UTILIZING ONE OR MORE QUERY   │
│ PROCESSING THREADS OF A QUERY THREAD POOL TO PROCESS        │
│ QUERIES, RECEIVED VIA THE NETWORK CONNECTION, OF INDEXED    │
│ DOCUMENTS, WHEREIN A SUM OF THE INDEX THREAD POOL AND THE   │
│ QUERY THREAD POOL IS A PLURALITY OF PROCESSING THREADS      │
│ 420                                                         │
└─────────────────────────────────────────────────────────────┘
                              │
                              ▼
┌─────────────────────────────────────────────────────────────┐
│ RESPONSIVE TO THE WORK QUEUE BUFFER REACHING A PREDEFINED   │
│ FULLNESS, EMPTYING THE WORK QUEUE BUFFER BY BACKING UP THE  │
│ WORK QUEUE BUFFER INTO AN ALLOTTED STORAGE SPACE IN A DATA  │
│ STORAGE DEVICE OF THE DISTRIBUTED COMPUTING SYSTEM          │
│ 430                                                         │
└─────────────────────────────────────────────────────────────┘
                              │
                              ▼
┌─────────────────────────────────────────────────────────────┐
│ MONITORING A RATIO OF A UTILIZED AMOUNT OF THE ALLOTTED     │
│ STORAGE SPACE TO A TOTAL AMOUNT OF THE ALLOTTED STORAGE     │
│ SPACE AS A SINGLE INDICATOR OF RESOURCE CONTENTION IN THE   │
│ DISTRIBUTED INDEX AND QUERY SYSTEM                          │
│ 440                                                         │
└─────────────────────────────────────────────────────────────┘
```

> RESPONSIVE TO WORKING OFF CONTENTS OF THE WORK QUEUE BUFFER, READING BACKED UP DOCUMENTS FROM THE ALLOTTED STORAGE SPACE INTO THE WORK QUEUE BUFFER
> 470

> RESETTING THE NUMBER OF INDEX PROCESSING THREADS, OF THE PLURALITY OF PROCESSING THREADS ALLOCATED TO THE INDEX THREAD POOL, IN A LINEAR RELATIONSHIP TO A REVISED A RATIO OF THE UTILIZED AMOUNT OF THE ALLOTTED STORAGE SPACE TO THE TOTAL AMOUNT OF THE ALLOTTED STORAGE SPACE
> 480

FIG. 4D

CONTENTION MANAGEMENT IN A DISTRIBUTED INDEX AND QUERY SYSTEM

BACKGROUND

Some examples of modern distributed computing systems include networked computers, net servers, and larger enterprise systems. These and other distributed computing systems often involve databases that contain bundles of textual data, which can be thought of and referred to as "documents," and which may be indexed and queried.

A distributed index and query system processes incoming documents to create a searchable index while at the same time processing queries on the index or indexes and documents indexed therein. In a resource constrained environment, the index and query tasks compete for system resources such as: network throughput, bus bandwidth, memory, disk speed, various cache sizes, and processor usage. Interaction between the index and query tasks as they compete for resources is difficult to model as implementations of a system and the hardware on which it runs are often not identical or may be subject to frequent change. Contention between resources and/or problems in scheduling index and query tasks results in poor performance of the system. Poor performance may be evidenced by a slowdown in indexing new documents, a slowdown in querying response times, or a slowdown of both tasks.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIGS. 3A-3D illustrate a flow diagram of a method of contention management in a distributed index and query system, in accordance with various embodiments.

FIGS. 4A-4D illustrate a flow diagram of a method of contention management in a distributed index and query system, in accordance with various embodiments.

DESCRIPTION OF EMBODIMENTS

Figure 1:
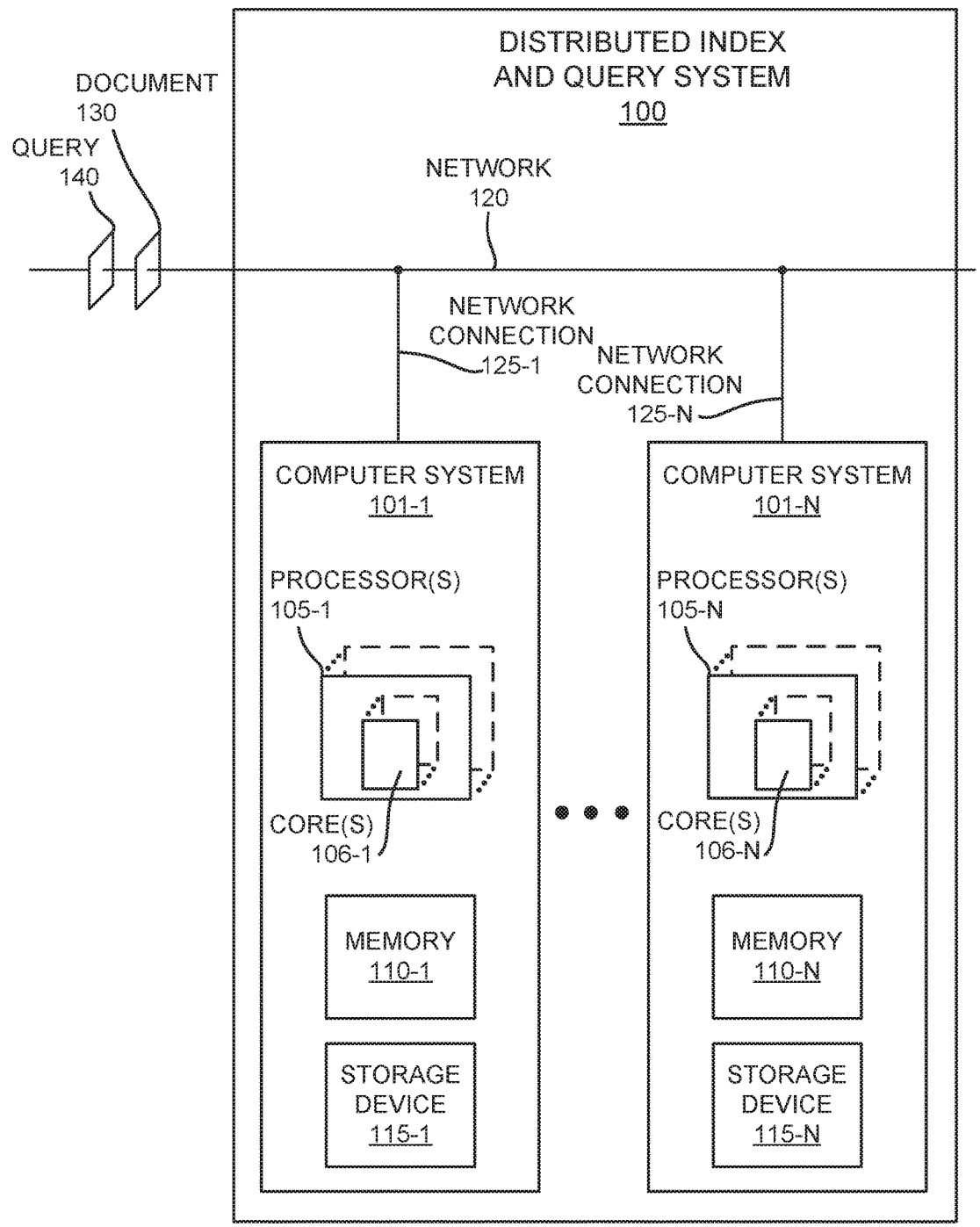
FIG. 1 is an example block diagram of a distributed index and query system that includes a plurality of networked computer systems, in accordance with embodiments.

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments. In general, embodiments described herein provide for improvements in and operational efficiency increases in computing systems (such as computing systems that perform both index and query of documents).

Notation and Nomenclature

Unless specifically stated otherwise as apparent from the following discussions, it is appreciated that throughout the present Description of Embodiments, discussions utilizing terms such as "utilizing," "emptying," "setting," "backing up," "writing," "reading," "resetting," "monitoring," "rounding," "receiving," "communicating," "idexing," "querying," or the like, often refer to the actions and processes of an electronic computing device or system, such as an index and query system or a distributed computing system, as but two examples. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

Interaction between index and query tasks in a computing system that performs index and query simultaneously with one another is difficult to model and such a system has, conventionally, been difficult to monitor for contention. Herein, techniques are described in which a plurality of processing threads is divided into index processing threads in an index thread pool and query processing threads in a query thread pool. Executing index and query tasks in these separate thread pools allows for restraining and/or increasing the number of concurrent tasks of each type. Further, as will be described herein, the use of a storage device (e.g., disk drive) backed work queue buffer mixes resources (memory, processing, bandwidth, storage, etc.) and allows overall resource contention to be monitored by observing the amount of an allotted storage space that is used up for backing up the work queue buffer. The amount of the allotted storage space that is utilized may also be used as a benchmark to adjust the number of the plurality of processing threads that is allocated to each of the query thread pool and the index thread pool.

Discussion begins with a description of an example distributed index and query system that includes multiple computer systems. Operation of various components of the distributed index and query system is described. Techniques for backing up a work queue buffer to a storage device are illustrated and described, along with techniques for reading documents from a storage device back into a work queue buffer. Techniques for setting a number of index processing threads in an index thread pool are discussed as well as techniques for setting the number of query processing threads in a query thread pool. Operation of various components of a query and indexing system are further described in conjunction with description of various methods of contention management.

Example Distributed Index and Query System

FIG. 1 is an example block diagram of a distributed index and query system 100 that includes a plurality of networked computer systems (101-1 . . . 101-N), in accordance with embodiments. As depicted in FIG. 1, distributed index and query system 100 includes a plurality of computer systems 101 (101-1 . . . 101-N) communicatively coupled with a network 120. Computer system 101-1 is communicatively coupled to network 120 by network connection 125-1, which may comprise a network interface card or other communicative coupling mechanism. Similarly, computer system 101-N is communicatively coupled to network 120 by network connection 125-N, which may comprise a network interface card or other communicative coupling mechanism. Although only two computer systems 101 (101-1 and 101-N) are illustrated in distributed index and query system 100, more may be included in some embodiments.

Network 120 operates to communicatively couple computer systems 101 (e.g., 101-1 . . . 101-N) with one another as part of a network and to facilitate receipt of documents 130 for indexing, and queries 140 for processing.

Computer system 101-1 includes one or more processors 105-1. Computer system 101-1 includes or has access to a memory 110-1 and a storage device 115-1. Each included processor 105-1 includes one or more processing cores 106-1. Memory 110-1 typically comprises random access memory. Storage device 115-1 typically comprises one or some combination of magnetic disks and tapes, solid state drives/"disks," optical disks, and/or direct access storage devices such as hard disk drives.

Computer system 101-N includes one or more processors 105-N. Computer system 101-N includes or has access to a memory 110-N and a storage device 115-N. Each included processor 105-N includes one or more processing cores 106-N. Memory 110-N typically comprises random access memory. Storage device 115-N typically comprises one or some combination of magnetic disks and tapes, solid state drives/"disks," optical disks, and/or direct access storage devices such as hard disk drives.

The number of processing cores 106 in a processor 105 defines the total number of processing threads available in that processor, where one processing core equates to one processing thread. Adding up the total number of processing cores 106 in the total number of processors 105 in computer system 101 provides the total number of processing threads available in that computer system 101. In distributed index and query system 100, the total number of processing threads is determined by adding up the processing threads of each computer system 101 (e.g., 101-1 . . . 101-N) in the distributed index and query system 100. Some portion of the total number of processing threads in distributed index and query system 100 may be utilized for indexing documents, such as document 130, received via a network connection 125 to network 120. Similarly, some portion of the total number of processing threads in distributed index and query system 100 may be utilized for processing and responding to queries, such as query 140, received via a network connection 125 to network 120.

Figure 2A:
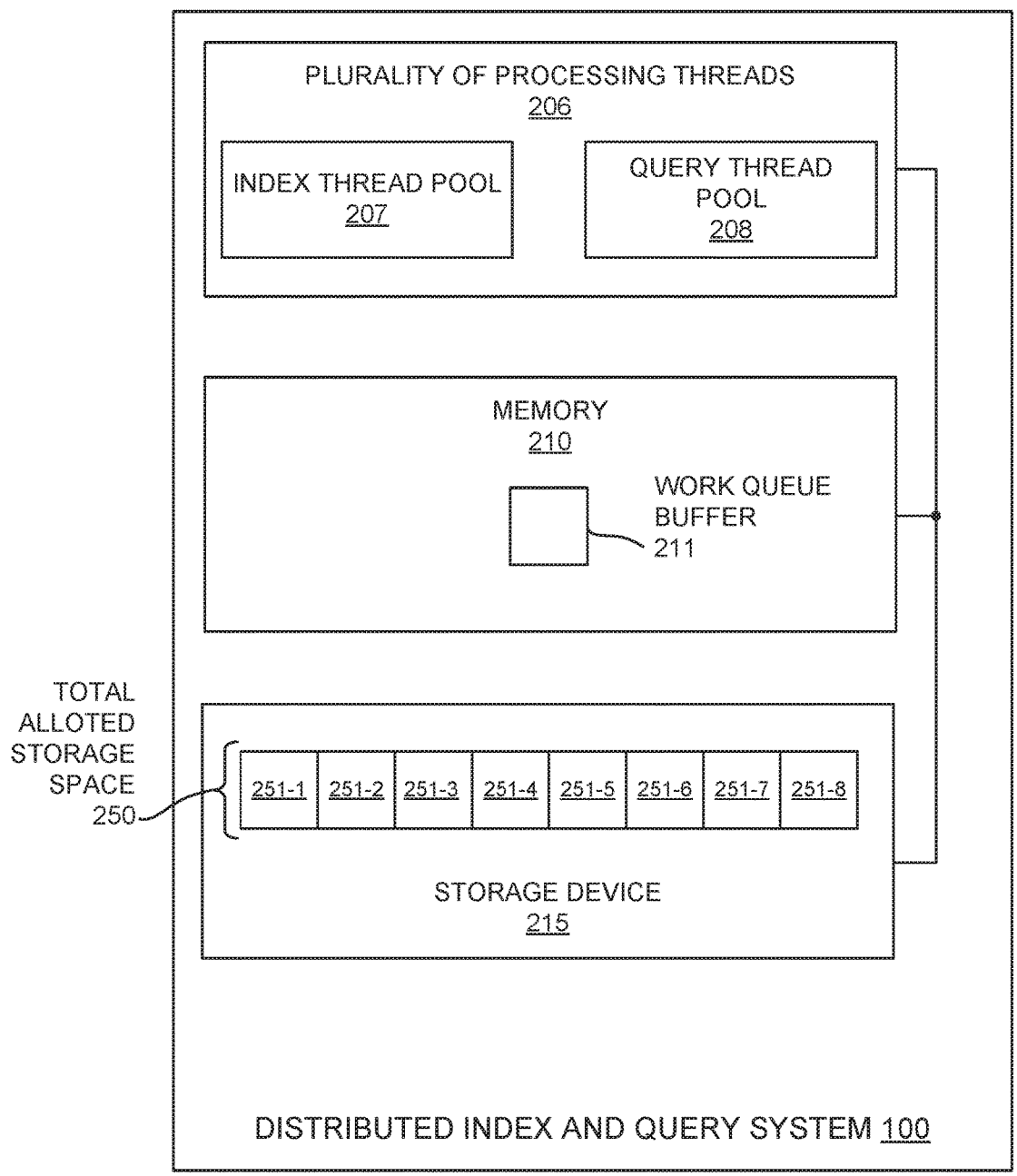
FIG. 2A illustrates an example of distributed index and query system with an index thread pool, a query thread pool, a work queue buffer, and an allotted storage space in a storage device to back up unindexed documents from the work queue buffer, in accordance with an embodiment.

FIG. 2A illustrates an example of distributed index and query system 100 with an index thread pool 207, a query thread pool 208, a work queue buffer 211 in a memory 210, and an allotted storage space 250 in a storage device 215 to back up unindexed documents from the work queue buffer 211, in accordance with various embodiments. For purposes of example, and not of limitation, the total allotted storage space 250 has been divided into eight equal portions (251-1, 251-2, 251-3, 251-4, 251-5, 251-6, 251-7, and 251-8) that each provide the same amount of storage as work queue buffer 211. Memory 210 is an abstraction which is made up of all or part of one or more of the memories 110 depicted in FIG. 1. Similarly, storage device 215 is an abstraction which is made up of all or part of one or more of the storage devices 115 depicted in FIG. 1. Plurality of processing threads 206 is made up from processing threads provided from the total number of processing threads (provided by cores 106) available across distributed index and query system 100. Individual processing threads in plurality of processing threads 206 are allocated for use in either index thread pool 207 or in a query thread pool 208.

When placed into index thread pool 207, a processing thread becomes an "index processing thread" that is only utilized for indexing operations. Indexing operations may include receiving textual collections of information called "documents," such as document 130, from network 120 and placing them into work queue buffer 211. Indexing operations may also include indexing documents from work queue buffer 211 into an index (which may be in the form of an array) stored in storage device 215. Indexing operations may also include writing documents from work queue buffer 211 to a portion of a total allotted storage space 250 on storage device 215 when work queue buffer 211 meets a fullness threshold. Indexing operations may also include reading previously backed-up documents from a portion of total allotted storage space 250 into work queue buffer 211 when work queue buffer 211 is worked off to an emptiness threshold. Indexing operations may also include monitoring. Such as monitoring a total amount of storage space utilized for backing-up the work queue buffer 211 and/or monitoring a ratio of allotted storage space to the total allotted storage space. Indexing operations may also include using this ratio to set the number of the plurality of processing threads 206 that are allocated into the index thread pool 207 and/or the number of plurality of processing threads 206 that are allocated into the query thread pool 208.

When placed into query thread pool 208, a processing thread becomes a "query processing thread" that is only utilized for querying operations. Querying operations may include receiving query requests, such as query 140, from network 120. Querying operations may also involve conducting or carrying out all or a portion of a query request. A query 140 is a request to perform some type of a search of the indexed documents that comes in the form of a search string, a structured query language, or the like. The query operations are distributed, and may utilize two or more query processing threads to gather partial responses to a query which are then assembled into a complete response to the query. As query and index operations run simultaneously on distributed index and query system 100, contention between resources that are used to perform both tasks can occur. Contention can slow the performance of one or both of the index and query tasks. When index tasks are slowed, a backlog of unindexed documents can form, which can be detrimental to real-time or near real-time query results as the unindexed documents cannot be queried until they are indexed.

Executing index and query tasks in separate threads pools allows for restraining the number of concurrent tasks of each type. The use of a work queue buffer 211 that mixes various system resources is monitored. The size of this work queue buffer 211, and in particular the amount that has been backed up to an allotted storage space 250 in storage device 215, is monitored and/or used in order to adjust the concurrency of both thread pools.

The work queue buffer 211 is a queue that receives incoming network requests for document indexing and buffers the documents to be indexed into memory. Indexing work tasks, in the form of documents to be indexed, are then taken from the work queue buffer 211 by index processing threads. When this work queue buffer 211 reaches a predefined fullness threshold (e.g., 100% full, 95% full, 90% full, etc.), its contents (unindexed documents) are emptied by writing, and thus backing them up, to a portion 251 (e.g., portion 251-1) of a total alloted storage space 250 on a storage device 215. The work queue buffer 211 fills due to indexing tasks getting backed up for various reason such as, lack of index processing threads, lack of memory 210 and/or storage in storage device 215 to perform indexing, lack of bandwidth on network 120 to perform indexing. The process of emptying may empty 100% of the contents of work queue buffer 211 or empty contents until an emptiness threshold is met (e.g., 99% emptied, 95% emptied, 90% emptied, etc.) The emptied work queue buffer 211 can then be reused or a new work queue buffer 211 can be initiated within memory 210. When work queue buffer 211 is emptied due to working off indexing tasks (rather than due to being backed up), backed-up documents (if any exist) are read from storage device 215 into work queue buffer 211, thus freeing up room in the total allotted storage space 250. By mixing processor usage with memory and disk usage, all contended resources are represented by the stored work queue backlog. As a result, the length/size of the stored backlog or the ratio of the stored backlog to the total allotted storage space 250 can be monitored as a single value that describes the amount of contention of any of these resources.

The concurrency of the indexing thread pool is then set as a linear relationship with the backlog of the work queue buffer that has been backed up to storage device 215. That is, the larger the backed-up backlog, the greater the number of processing threads of the plurality of processing threads 206 that is allocated to the index thread pool 207 (rather than to the query thread pool 208). In some embodiments, the number of processing threads in the index thread pool may be set in a linear relationship to a ratio of a utilized amount of the allotted storage space 250 (i.e., utilized for backing up work queue buffer 211) to a total amount of the allotted storage space 250. In one embodiment, this ratio is multiplied with the number of processing threads in the plurality of processing threads 206, and the product of the multiplication is used to set the number of the plurality of processing threads 206 that are allocated to the index thread pool 207.

In some embodiments, the concurrency of query thread pool 208 is an inverse of the same calculation used to set the number of processing threads, of plurality of processing threads 206, that are allocated to the index thread pool. For example, in an embodiment where there are 32 total processing threads in the plurality of processing threads 206 and 8 of these processing threads are allocated to index thread pool 207, the other 24 of these processing threads will be allocated to query thread pool 208. In some embodiments, when the result of the calculation indicates a partial number of index processing threads (e.g., 1.7 or 1.25), it is rounded using standard rounding rules (i.e., 0.5 or greater rounds up, less than 0.5 rounds down). In some embodiments, when the result of the calculation indicates a partial number of index processing threads (e.g., 1.25), it is always rounded up to the next higher whole number of index processing threads (e.g., 2).

As contention is noticed through monitoring the backlog of work queue buffer 211 stored in storage device 215, the number of query processing threads in query thread pool 208 are reduced and the contention is reduced. Simultaneously, the number of index threads in index thread pool 207 is increased by the amount of threads that were reduced/removed from query thread pool 208. This allows for the index thread pool 207 to work through the backlog quickly, and then free up the resources for queries on the indexes it builds.

In some embodiments, a minimum number of index processing threads (e.g., one, two, three, etc.) may be maintained in index thread pool 207 even if there is no backlog stored on storage device 215. In such embodiments, the backlog of work queue buffer 211 stored on storage device 215 needs to meet a threshold size before there is an adjustment of the allotment of index threads in index thread pool 207. In some embodiments, a minimum number of query processing threads (one, two, three, etc.) may be maintained in query thread pool 208 even if the backlog of work queue buffer 211 fills the entire allotted storage space 250 of storage device 215. In one embodiment, the minimum number of processing threads is set to one thread in each of the index thread pool 207 and the query thread pool 208.

Figure 2B:
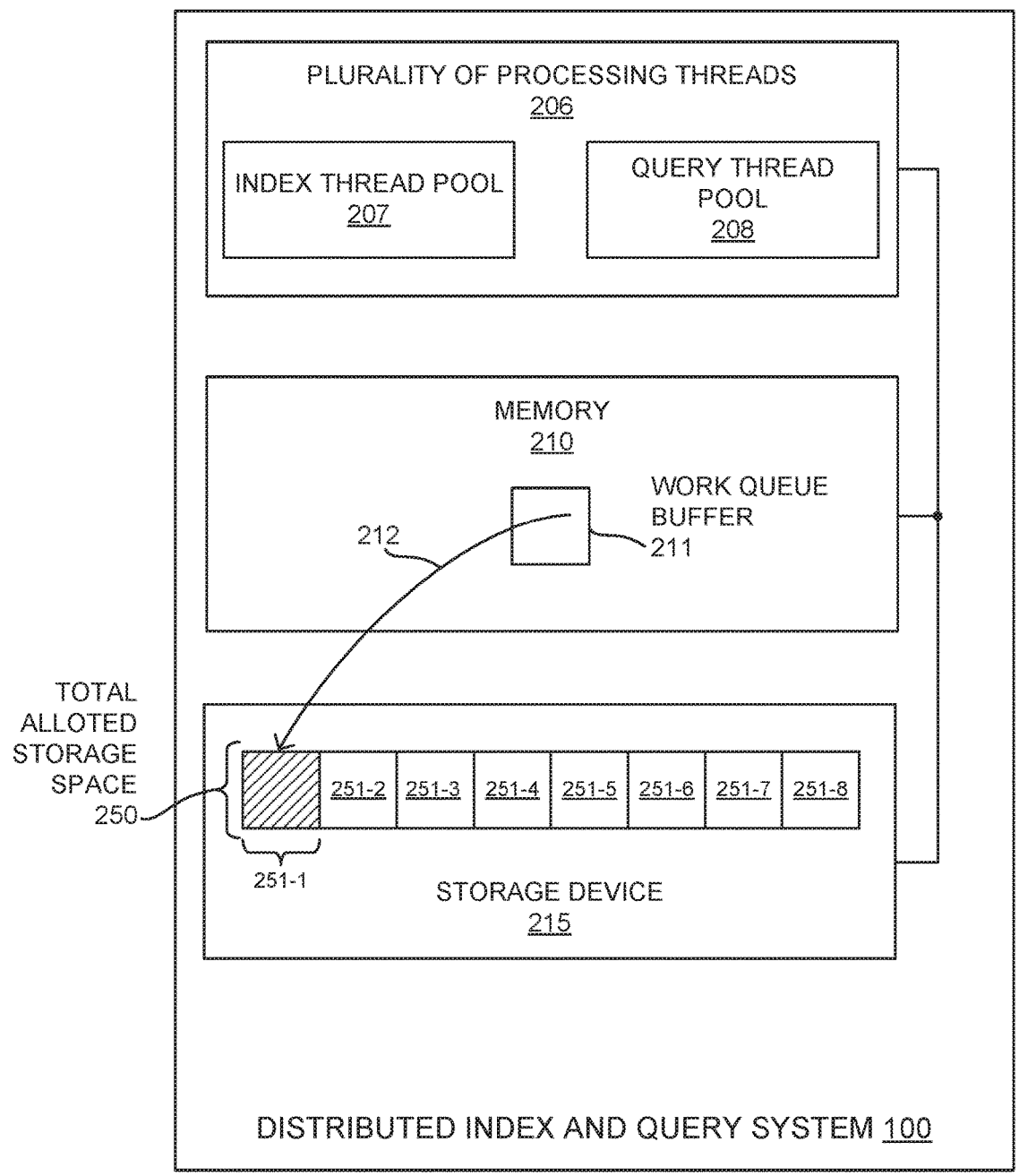
FIG. 2B illustrates an example of backing up unindexed documents in a work queue buffer to a storage device, in accordance with an embodiment.

FIG. 2B illustrates an example of backing up unindexed documents in a work queue buffer 211 to a storage device 215, in accordance with an embodiment. For purposes of example only, and not of limitation, in FIGS. 2B, 2C, and 2D, it may be presumed that plurality of processing threads 206 includes 100 processing threads which are allocated either into index thread pool 207 or query thread pool 208. In the initial allocation, index thread pool 207 is allocated with 6 processing threads which is the minimum number that it is allowed to be allocated; and query thread pool 208 is allocated the inverse of the 100 processing threads, or 94 processing threads. After operating for a while, work queue buffer 211 becomes 100% full. As indicated by arrow 212, the documents in work queue buffer 211 are written to portion 251-1 of allotted storage space 250. This writing backs-up the documents and empties work queue buffer 211. Upon altering the amount of storage of allotted storage space 250 that is in use, the allocation the plurality of processing threads 206 between index thread pool 207 and query thread pool 208 is reevaluated. One eighth (0.125) of the total allotted storage space has been utilized to back up work queue buffer 211. This value is multiplied times the number of total processing threads in plurality of processing threads 206 (e.g., 0.125×100=12.5) to determine that 12.5 processing threads of plurality of processing threads 206 should be allocated to index thread pool 207 to be used as index processing threads. In one embodiment, this number is rounded up to 13, and the number of index processing threads is set at 13 (versus the previous 6). In one embodiment, the inverse number of processing threads, of the total number of the plurality of processing threads 206, is allocated to query thread pool 208 to be used as query processing threads. In this example, the number of query processing threads is thus set at 87 (versus the previous 94).

Figure 2C:
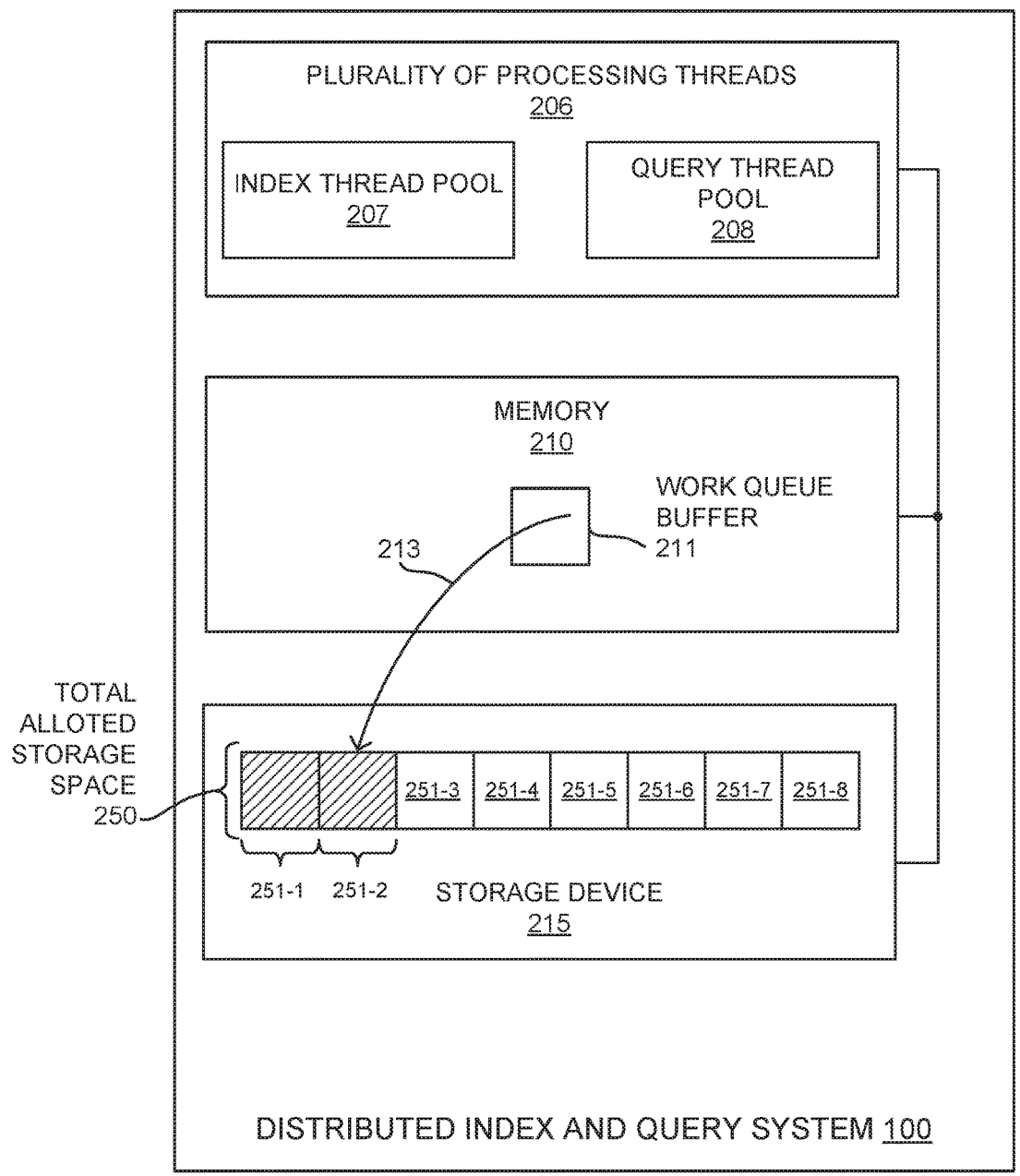
FIG. 2C illustrates a second example of backing up unindexed documents in a work queue buffer to the storage device, in accordance with an embodiment.

FIG. 2C illustrates a second example of backing up unindexed documents in a work queue buffer 211 to the storage device 215, in accordance with an embodiment. FIG.

2C continues the example started in FIG. 2B. In FIG. 2C, work queue buffer 211 has been backed up to storage device 215 a second time, as indicated by arrow 213 pointing to storage portion 251-2. Upon altering the amount of storage of allotted storage space 250 that is in use, the allocation of the plurality of processing threads 206 between index thread pool 207 and query thread pool 208 is reevaluated. One fourth (0.250) of the total allotted storage space has been utilized to back up work queue buffer 211. This value is multiplied times the number of total processing threads in plurality of processing threads 206 (e.g., 0.250×100=25) to determine that 25 processing threads of plurality of processing threads 206 should be allocated to index thread pool 207 to be used as index processing threads. In one embodiment, the number of index processing threads is set at 25 (versus the previous 13). In one embodiment, the inverse number of processing threads, of the total number of the plurality of processing threads 206, is allocated to query thread pool 208 to be used as query processing threads. In this example, the number of query processing threads is thus set at 75 (versus the previous 87).

Figure 2D:
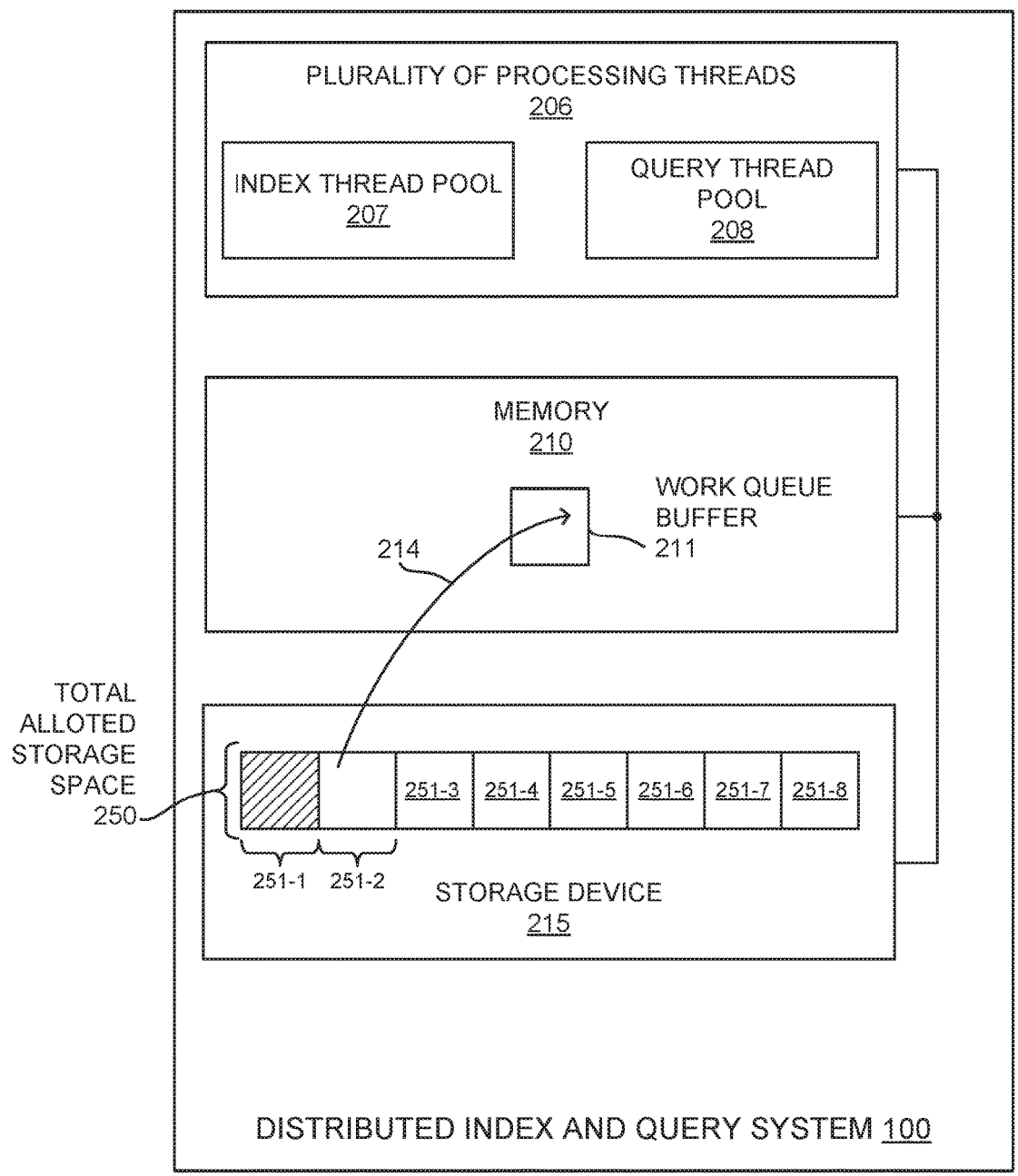
FIG. 2D illustrates an example of reading documents out of a backed up work queue on a storage device into a work queue buffer, in accordance with an embodiment.

FIG. 2D illustrates an example of reading documents out of a backed-up work queue on a storage device 215 into a work queue buffer 211, in accordance with an embodiment. FIG. 2D continues the example discussed in FIG. 2B and FIG. 2C. In FIG. 2D, work queue buffer 211 has been worked-off and a block of backed up documents has been read out of storage device 215 into work queue buffer 211, as indicated by arrow 214 pointing from storage portion 251-2 to work queue buffer 211. Upon altering the amount of storage of allotted storage space 250 that is in use by removing documents from storage portion 251-2, the allocation the plurality of processing threads 206 between index thread pool 207 and query thread pool 208 is reevaluated. One eighth (0.125) of the total allotted storage space has been utilized to back up work queue buffer 211. This value is multiplied times the number of total processing threads in plurality of processing threads 206 (e.g., 0.125×100=12.5) to determine that 12.5 processing threads of plurality of processing threads 206 should be allocated to index thread pool 207 to be used as index processing threads. In one embodiment, this number is rounded up to 13, and the number of index processing threads is set at 13 (versus the previous 25). In one embodiment, the invers number of processing threads, of the total number of the plurality of processing threads 206, is allocated to query thread pool 208 to be used as query processing threads. In this example, number of query processing threads is set at 87 (versus the previous 75).

It should be appreciated that while the examples in FIGS. 2A-2D were simplified by using equal portion sizes 251, that the technique works equally well using actual amounts of storage. For example, if 500 megabytes is allotted for the total allotted storage space 250, the amount of this that is utilized can be monitored to evaluate contention. Similarly, the ratio of the amount of storage spaced utilized for backing the work queue buffer 211 to the total amount of allotted storage space (e.g., 300 MB/500 MB, etc.) can be calculated and used to set the number of the plurality of processing threads 206 to be allocated to index thread pool 207.

Example Methods of Operation

The following discussion sets forth in detail the operation of some example methods of operation of embodiments. With reference to FIGS. 3A-3D and FIGS. 4A-4D, flow diagrams 300 and 400 illustrate example procedures used by various embodiments. Flow diagrams 300 and 400 include some procedures that, in various embodiments, are carried out by a processor under the control of computer-readable and computer-executable instructions. In this fashion, procedures described herein and in conjunction with flow diagrams 300 and/or 400 are, or may be, implemented using a computer system (which may be a distributed computer system), in various embodiments. The computer-readable and computer-executable instructions can reside in any non-transitory computer readable storage media. Some non-limiting examples of non-transitory computer readable storage media include random access memory, read only memory, magnetic disks and tapes, solid state drives/ "disks," optical disks, direct access storage devices, any or all of which may be employed with a computing system such as distributed computing system 100. The computer-readable and computer-executable instructions, which reside on non-transitory computer readable storage media, are used to control or operate in conjunction with, for example, one or some combination of processors of distributed index and query system 100, a computer system 101, or the like. It is appreciated that the processor(s) may be physical or virtual or some combination (it should also be appreciated that a virtual processor is implemented on physical hardware). Although specific procedures are disclosed in flow diagrams 300 and 400, such procedures are examples. That is, embodiments are well suited to performing various other procedures or variations of the procedures recited in flow diagram 300 and/or 400. Likewise, in some embodiments, the procedures in flow diagrams 300 and/or 400 may be performed in an order different than presented and/or not all of the procedures described in one or more of these flow diagrams may be performed. It is further appreciated that procedures described in flow diagram 300 and/or 400 may be implemented in hardware, or a combination of hardware with firmware and/or software.

FIG. 3A is a flow diagram 300 of a method of contention management in a distributed index and query system (such as distributed index and query system 100), in accordance with various embodiments.

At 310 of flow diagram 300, in one embodiment, the method utilizes one or more index processing threads of an index thread pool 207 in a distributed index and query system 100 to index documents (e.g., document 130 and the like) buffered into a work queue buffer 211 in a memory 210 of the distributed index and query system 100 after being received via a network connection (e.g., a network connection 125 to network 120).

At 320 of flow diagram 300, in one embodiment, simultaneous to the indexing, the method utilizes one or more query processing threads of a query thread pool 208 to process queries (e.g., query 140 and the like), received via the network connection, of indexed documents, wherein a sum of the index processing threads and the query processing threads is a plurality of processing threads. For example, the indexed documents may be in one or more indices that are stored on storage device 215.

At 330 of flow diagram 300, in one embodiment, responsive to the work queue buffer reaching a predefined fullness, the method empties the work queue buffer 211 by backing up the work queue buffer into an allotted storage space (e.g., into a portion of allotted storage space 250) in a data storage device 215 of the distributed index and query system 100. The predefined level of fullness can be a fullness threshold such as 100% full, 95% full, 90% full, or some other predefined fullness. This emptying of work queue buffer 211 is illustrated and described in conjunction with FIG. 2B and FIG. 2C. In some embodiments, distributed index and query system 100 may utilize an index processing thread from index thread pool 207 to empty work queue buffer 211. In some embodiments, distributed index and query system 100 may utilize a processing thread that is not included in plurality of processing threads 206 (i.e., not in either index thread pool 207 or query thread pool 208) to empty work queue buffer 211; this processing thread may be used for system health/contention monitoring, document and/or query intake, or other tasks when it is not moving documents between work queue buffer 211 and storage device 215.

At 340 of flow diagram 300, in one embodiment, the method sets a number of index processing threads, of the plurality of processing threads 206 allocated to the index thread pool 207, in a linear relationship to a ratio of a utilized amount of the allotted storage space to a total amount of the allotted storage space 250. For example, this can comprise an index processing thread determining the ratio and setting the allocation. This can also comprise a health/contention monitoring thread that is not included in the plurality of processing threads 206 determining the ratio and setting the allocation. As discussed previously, the ratio can be multiplied by the amount the total number of the plurality of processing threads 206, and the product of this multiplication then used to set the number of threads to be allocated to index thread pool 207. If the product results in a partial number, such as 2.4, rounding rules can be applied. For example, this can comprise rounding any partial number of index processing threads to a next highest whole number (e.g., 2.4 would be rounded to 3.0). In some embodiments, the number of index processing threads may have a preset minimum value that is at least one and may be greater. In such embodiments, the number of index processing threads is still set in a linear relationship to the ratio whenever the ratio indicates an allotment of processing threads that is over the preset minimum.

Figure 3B:
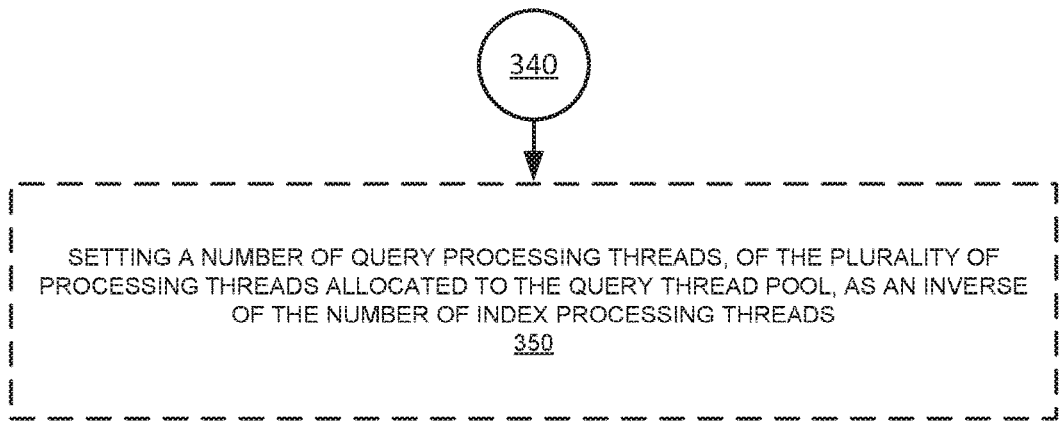

Referring now to FIG. 3B, at 350 of flow diagram 300, in one embodiment, the method as described in 310-340 further comprises setting a number of query processing threads, of the plurality of processing threads 206 allocated to the query thread pool 208, as an inverse of the number of index processing threads. For example, if a total number of processing threads in the plurality of processing threads 206 is 200 processing threads, and 30 of them are allocated as index processing threads, then the inverse (170 of the 200) would be allocated as query processing threads.

Figure 3C:
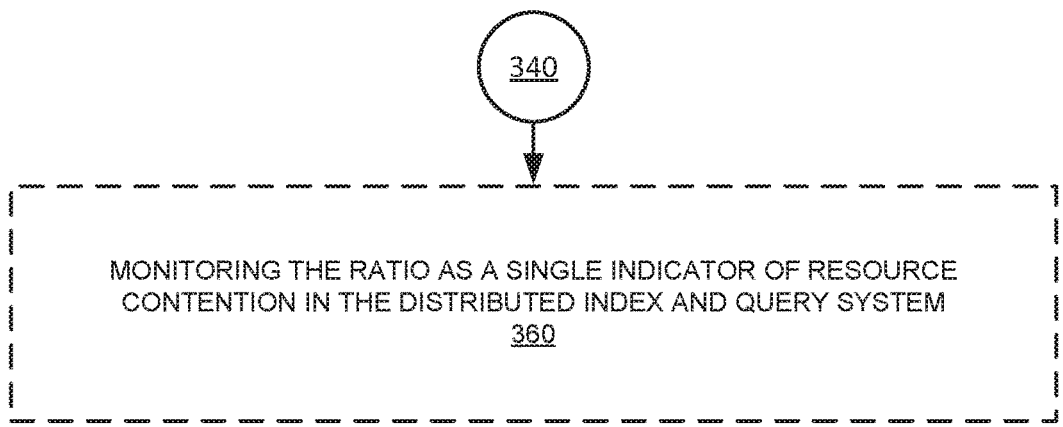

Referring not to FIG. 3C, at 360 of flow diagram 300, in one embodiment, the method as described in 310-340 further comprises monitoring a ratio of a utilized amount of the allotted storage space. This can comprise monitoring just the utilized amount, or monitoring a ratio of the utilized amount to a total amount of the allotted storage space as a single indicator of resource contention in the distributed index and query system. In some embodiments, if the monitored value meets a preset threshold, an action can be triggered such as sending email or other notification to a responsible party to alert to contention issues. In one embodiment, by way of example only, such a notification might be sent if more than 90% of the total amount of allotted storage space has been utilized, as this may be indicative of the distributed index and query system 100 being under-resourced in some fashion.

Referring now to FIG. 3D, at 370 of flow diagram 300, in one embodiment, the method as described in 310-340 further comprises responsive to working off contents of the work queue buffer 211, reading backed up documents from the allotted storage space 250 into the work queue buffer 211. The reading can occur when the work queue buffer has been completely worked off (i.e., is 100% empty) or when enough documents have been indexed so that the work queue buffer 211 meets an emptiness threshold (e.g., 99% empty, 97% empty, 95% empty, etc.) The reading can be accomplished by an index processing thread or by a processing thread that is not included in the plurality of processing threads 206. An example of this reading is illustrated and discussed in conjunction with FIG. 2D.

With continued reference to FIG. 3D, at 380 of flow diagram 300, in one embodiment, the method as described in 310-340 and 370 further comprises resetting a number of index processing threads, of the plurality of processing threads 206 allocated to the index thread pool 207, in a linear relationship to a revised ratio of the utilized amount of the allotted storage space to the total amount of the allotted storage space 250. Generally, anytime the size of the backed-up work queue information is altered, the ratio of utilized storage to the total allotted storage can be determined to ascertain whether or not the number of index processing threads should be reset. Additionally, when the number or index processing threads is reset to a different number, the number of query processing threads may also be reset (so as to maintain it at an inverse to the number of index processing threads).

FIG. 4A is a flow diagram 400 of a method of contention management in a distributed index and query system (such as distributed index and query system 100), in accordance with various embodiments.

At 410 of flow diagram 400, in one embodiment, the method utilizes one or more index processing threads of an index thread pool 207 in a distributed index and query system 100 to index documents (e.g., document 130 and the like) buffered into a work queue buffer 211 in a memory 210 of the distributed index and query system 100 after being received via a network connection (e.g., a network connection 125 to network 120).

At 420 of flow diagram 400, in one embodiment, simultaneous to the indexing, the method utilizes one or more query processing threads of a query thread pool 208 to process queries (e.g., query 140 and the like), received via the network connection, of indexed documents, wherein a sum of the index processing threads and the query processing threads is a plurality of processing threads. For example, the indexed documents may be in one or more indices that are stored on storage device 215.

At 430 of flow diagram 400, in one embodiment, responsive to the work queue buffer reaching a predefined fullness, the method empties the work queue buffer 211 by backing up the work queue buffer into an allotted storage space (e.g., into a portion of allotted storage space 250) in a data storage device 215 of the distributed index and query system 100. The predefined level of fullness can be a fullness threshold such as 100% full, 95% full, 90% full, or some other predefined fullness. This emptying of work queue buffer 211 is illustrated and described in conjunction with FIG. 2B and FIG. 2C. In some embodiments, distributed index and query system 100 may utilize an index processing thread from index thread pool 207 to empty work queue buffer 211. In some embodiments, distributed index and query system 100 may utilize a processing thread that is not included in plurality of processing threads 206 (i.e., not in either index thread pool 207 or query thread pool 208) to empty work queue buffer 211; this processing thread may be used for system health/contention monitoring, document and/or query intake, or other tasks when it is not moving documents between work queue buffer 211 and storage device 215.

At 440 of flow diagram 400, in one embodiment, monitoring a ratio of a utilized amount of the allotted storage space to a total amount of the allotted storage space 250 as a single indicator of resource contention in the distributed index and query system 100. This can comprise monitoring just the utilized amount, or monitoring a ratio of the utilized amount to a total amount of the allotted storage space as a single indicator of resource contention in the distributed index and query system. In some embodiments, if the monitored value meets a preset threshold, an action can be triggered such as sending email or other notification to a responsible party to alert to contention issues. In one embodiment, by way of example and not of limitation, such a notification might be sent if more than 95% of the total amount of allotted storage space has been utilized, as this may be indicative of the distributed index and query system 100 being under resourced in some fashion. In other embodiments, this monitored value may be provided as a notification, to a responsible party such as a system administrator, at regular intervals or in response to a request.

Figure 4B:
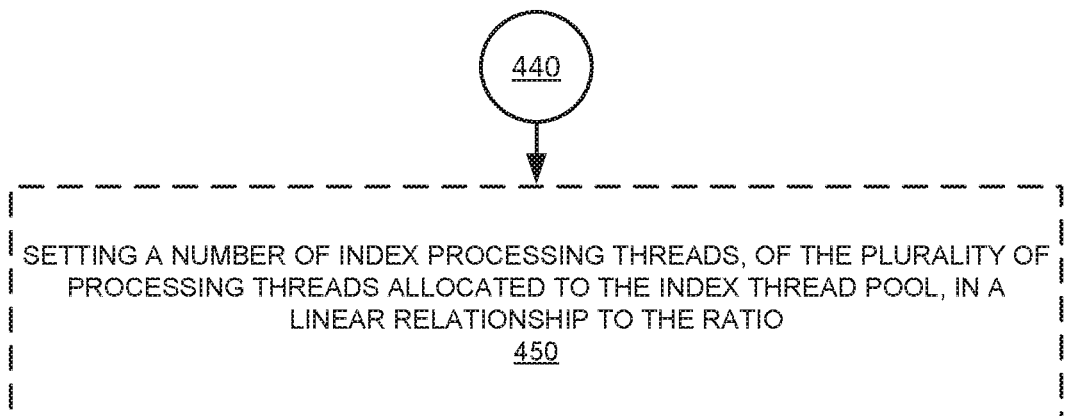

Referring now to FIG. 4B, at 450 of flow diagram 400, in one embodiment, the method as described in 410-440 further comprises setting a number of index processing threads, of the plurality of processing threads allocated to the index thread pool, in a linear relationship to the ratio. This can be accomplished in the manner previously discussed in 340 of flow diagram 300.

Figure 4C:
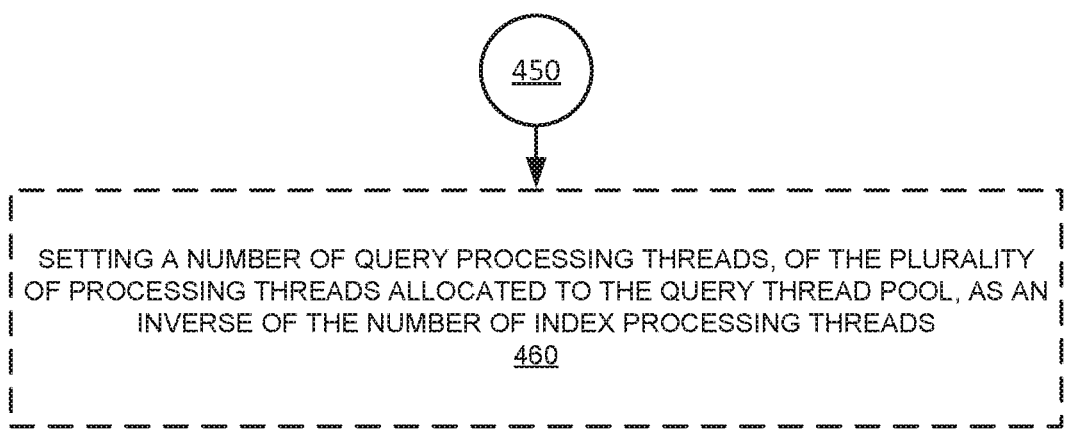

Referring now to FIG. 4C, at 460 of flow diagram 400, in one embodiment, the method as described in 410-450 further comprises setting a number of query processing threads, of the plurality of processing threads 206 allocated to the query thread pool 208, as an inverse of the number of index processing threads. This can be accomplished in the manner previously discussed in 350 of flow diagram 300.

Referring now to FIG. 4D, at 470 of flow diagram 400, in one embodiment, the method as described in 410-450 further comprises responsive to working off contents of the work queue buffer 211, reading backed up documents from the allotted storage space 250 into the work queue buffer 211. This can be accomplished in the manner previously discussed in 370 of flow diagram 300.

With continued reference to FIG. 4D, at 480 of flow diagram 400, in one embodiment, the method as described in 410-450 and 470 further comprises resetting a number of index processing threads, of the plurality of processing threads 206 allocated to the index thread pool 207, in a linear relationship to a revised ratio of the utilized amount of the allotted storage space to the total amount of the allotted storage space 250. This can be accomplished in the manner previously discussed in 380 of flow diagram 300.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A method of contention management in a distributed index and query system, the method comprising:
   utilizing one or more index processing threads of an index thread pool in a distributed index and query system to index documents buffered into a work queue buffer in a memory of the distributed index and query system after being received via a network connection;
   simultaneous to the indexing, utilizing one or more query processing threads of a query thread pool to process queries, received via the network connection, of indexed documents, wherein a sum of the index processing threads and the query processing threads is a plurality of processing threads;
   responsive to the work queue buffer reaching a predefined fullness, emptying the work queue buffer by backing up the work queue buffer into an allotted storage space in a data storage device of the distributed index and query system; and
   setting a number of index processing threads, of the plurality of processing threads allocated to the index thread pool, in a linear relationship to a ratio of a utilized amount of the allotted storage space to a total amount of the allotted storage space.

2. The method as recited in claim 1, further comprising:
   setting a number of query processing threads, of the plurality of processing threads allocated to the query thread pool, as an inverse of the number of index processing threads.

3. The method as recited in claim 1, further comprising:
   responsive to working off contents of the work queue buffer, reading backed up documents from the allotted storage space into the work queue buffer; and
   resetting a number of index processing threads, of the plurality of processing threads allocated to the index thread pool, in a linear relationship to a revised ratio of the utilized amount of the allotted storage space to the total amount of the allotted storage space.

4. The method as recited in claim 1, wherein emptying the work queue buffer by backing up the work queue buffer to a portion of an allotted storage space in a data storage device of the distributed index and query system comprises:
   utilizing an index processing thread to empty the work queue buffer.

5. The method as recited in claim 1, wherein emptying the work queue buffer by backing up the work queue buffer to a portion of an allotted storage space in a data storage device of the distributed index and query system comprises:
   utilizing a processing thread not included in the plurality of processing threads to empty the work queue buffer.

6. The method as recited in claim 1, wherein the setting a number of index processing threads, of the plurality of processing threads allocated to the index thread pool, as a linear relationship to a ratio of a utilized amount of the allotted storage space to a total amount of the allotted storage space comprises:
   rounding a partial number of index processing threads to a next highest whole number.

7. The method as recited in claim 1, wherein the setting a number of index processing threads, of the plurality of processing threads allocated to the index thread pool, in a linear relationship to a ratio of a utilized amount of the allotted storage space to a total amount of the allotted storage space comprises:
   setting the number of index processing threads, of the plurality of processing threads allocated to the index thread pool, in a linear relationship to the ratio, wherein the number of index processing threads is set to at least a minimum number regardless of the ratio.

8. A non-transitory computer readable storage medium having computer readable program code stored thereon for causing a computer system to perform a method of contention management in a distributed index and query system, the method comprising:

utilizing one or more index processing threads of an index thread pool in the distributed index and query system to index documents buffered into a work queue buffer in a memory of the distributed index and query system after being received via a network connection;

simultaneous to the indexing, utilizing one or more query processing threads of a query thread pool to process queries, received via the network connection, of indexed documents, wherein a sum of the index processing threads and the query processing threads is a plurality of processing threads;

responsive to the work queue buffer reaching a predefined fullness, emptying the work queue buffer by backing up the work queue buffer into an allotted storage space in a data storage device of the distributed index and query system; and setting a number of index processing threads, of the plurality of processing threads allocated to the index thread pool, in a linear relationship to a ratio of a utilized amount of the allotted storage space to a total amount of the allotted storage space.

9. The non-transitory computer readable storage medium of claim 8, further comprising:

setting a number of query processing threads, of the plurality of processing threads allocated to the query thread pool, as an inverse of the number of index processing threads.

10. The non-transitory computer readable storage medium of claim 8, further comprising:

responsive to working off contents of the work queue buffer, reading backed up documents from the allotted storage space into the work queue buffer; and resetting the number of index processing threads, of the plurality of processing threads allocated to the index thread pool, in a linear relationship to a revised a ratio of the utilized amount of the allotted storage space to the total amount of the allotted storage space.

11. The non-transitory computer readable storage medium of claim 8, wherein the setting the number of index processing threads, of the plurality of processing threads allocated to the index thread pool, as a linear relationship to the ratio comprises:

rounding a partial number of index processing threads to a next highest whole number.

12. The non-transitory computer readable storage medium of claim 8, wherein the setting the number of index processing threads, of the plurality of processing threads allocated to the index thread pool, in a linear relationship to the ratio comprises:

setting the number of index processing threads, of the plurality of processing threads allocated to the index thread pool, in a linear relationship to the ratio, wherein the number index of processing threads is set to at least a minimum number regardless of the ratio.

13. The non-transitory computer readable storage medium of claim 8, wherein emptying the work queue buffer by backing up the work queue buffer to a portion of an allotted storage space in a data storage device of the distributed index and query system comprises:

utilizing an index processing thread to empty the work queue buffer.

14. The non-transitory computer readable storage medium of claim 8, wherein emptying the work queue buffer by backing up the work queue buffer to a portion of an allotted storage space in a data storage device of the distributed index and query system comprises:

utilizing a processing thread not included in the plurality of processing threads to empty the work queue buffer.

15. A distributed index and query system comprising:

a memory;

a data storage device; and a plurality of processors configured to communicate with the memory and the data storage device, the plurality of processors comprising a plurality of processing threads formed into a query thread pool comprising query processing threads and an index thread pool comprising index processing threads, wherein a sum of the index processing threads and the query processing threads is equal to the plurality of processing threads;

wherein the plurality of processors is configured to:

utilize one or more index processing threads of the index thread pool to index documents buffered into a work queue buffer in the memory after the documents are received via a network connection;

simultaneous to the indexing, utilize one or more query processing threads of the query thread pool to process queries, received via the network connection, of indexed documents;

responsive to the work queue buffer reaching a predefined fullness, emptying the work queue buffer by backing up the work queue buffer into an allotted storage space in the data storage device; and set a number of index processing threads, of the plurality of processing threads allocated to the index thread pool, in a linear relationship to a ratio of a utilized amount of the allotted storage space to a total amount of the allotted storage space.

16. The distributed index and query system of claim 15, wherein the plurality of processors is further configured to:

set a number of query processing threads, of the plurality of processing threads allocated to the query thread pool, as an inverse of the number of index processing threads.

17. The distributed index and query system of claim 15, wherein the plurality of processors is further configured to:

monitor the ratio of the utilized amount of the allotted storage space to the total amount of the allotted storage space as a single indicator of resource contention in the distributed index and query system.

18. The distributed index and query system of claim 15, wherein the plurality of processors is further configured to:

responsive to working off contents of the work queue buffer, read backed up documents from the allotted storage space into the work queue buffer; and reset the number of index processing threads, of the plurality of processing threads allocated to the index thread pool, in a linear relationship to a revised ratio of the utilized amount of the allotted storage space to the total amount of the allotted storage space.

19. The distributed index and query system of claim 15, wherein at least two processors of the plurality of processors are disposed within separate communicatively coupled computer systems of the distributed network and query system.

* * * * *